Figure 1:
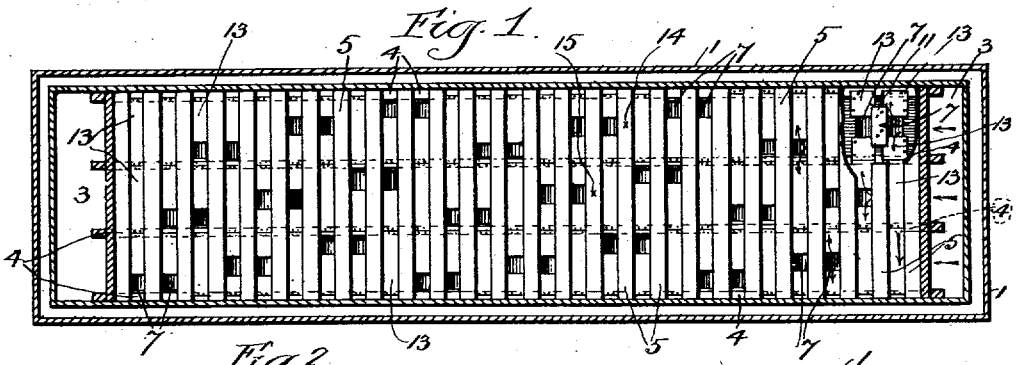

J. M. DALY.

CAR VENTILATOR.

No. 11,655. Reissued Mar. 15, 1898.

Witnesses
Wm. J. Fleming
Wm. M. Rheem.

Inventor
John M. Daly
by Elliott & Hopkins
Attys

UNITED STATES PATENT OFFICE.

JOHN M. DALY, OF CHICAGO, ILLINOIS.

CAR-VENTILATOR.

SPECIFICATION forming part of Reissued Letters Patent No. 11,655, dated March 15, 1898.

Original No. 590,642, dated September 28, 1897. Application for reissue filed December 31, 1897. Serial No. 665,191.

*To all whom it may concern:*

Be it known that I, JOHN M. DALY, a citizen of the United States, residing at Chicago, in the county of Cook and State of Illinois, have invented certain new and useful Improvements in Car-Ventilators, of which the following is a full, clear, and exact specification.

My invention relates to that class of car-ventilators in which are employed one or more longitudinal passages extending throughout the length of the car and adapted to receive air at either end, which escapes into the body of the car through cross-openings disposed at suitable intervals throughout the length of such passages, such passages being usually constituted by means of the false flooring, composed of transverse slats supported upon and secured to longitudinal beams resting on the bottom or flooring proper of the car. With this system of ventilation it is found that when the car is loaded with goods or freight in a compact mass the spaces between the slats are substantially covered over, so as to prevent the air from rising into the body of the car, and consequently instead of percolating through the freight, as intended, it passes on through the air-passage under the false flooring and escapes at the opposite end of the car without having performed its allotted function.

The primary object of my present invention, therefore, is to compel the air entering the passage or passages under the false floor to pass through the freight as its only course of escape. In accomplishing this object I construct a ventilator in which there is a longitudinal air-passage or a number of such passages extending lengthwise of the car and having openings disposed at suitable intervals throughout its length for admitting air to the interior or body of the car, and under each of these openings is arranged an inclined deflector which traps the current of air passing through the said passage and deflects it into the body of the car through said openings, and in order that the air after rising through such openings and coming in contact with the freight may not again pass downward into the passage under the false floor the deflector is of course sufficient in dimensions to completely underlie the opening. In this way the air has no course of escape excepting through the freight; but in order that this air may be distributed throughout the transverse extent of the car an open-sided channel is extended from the said opening in both directions, if necessary, over and across the longitudinal passage or passages, whereby the freight resting upon the false floor and extending across such channel will form one side of the channel along which the air may pass, but from which it cannot escape without percolating through the freight.

I have described my invention thus generally in order to indicate that it may be applied to other sides of the car than the bottom; but for ordinary purposes it will be used at the bottom side and will be partly constituted by the ordinary false slatted flooring, as I will now more specifically describe with reference to the accompanying drawings, in which—

Figure 2:
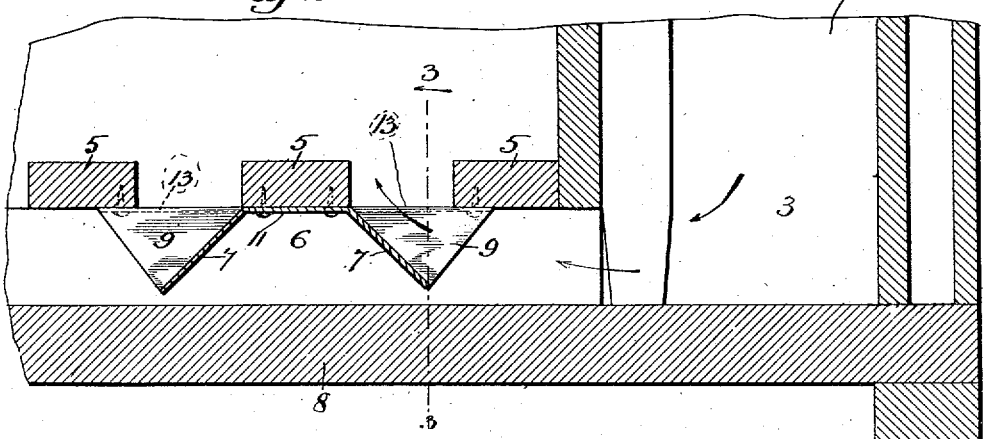
Figure 3:
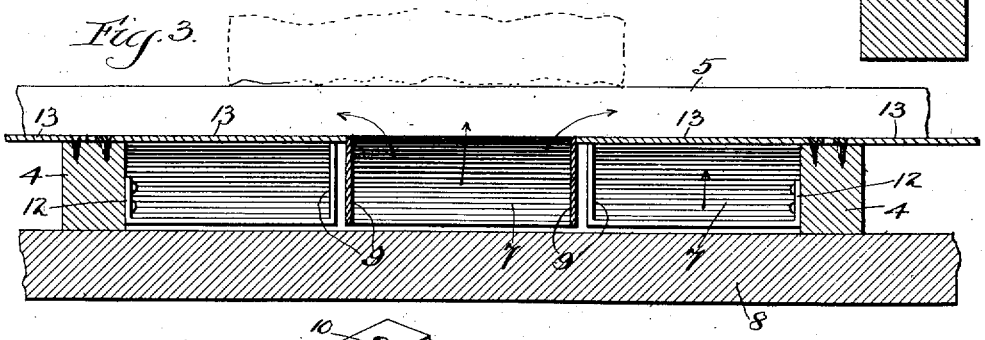
Figure 4:
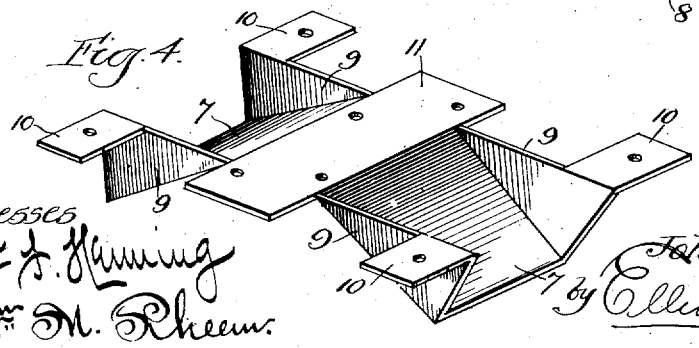

Figure 1 is a plan sectional view, partly broken away, of a car provided with my improvements. Fig. 2 is a vertical longitudinal section of a part thereof on an enlarged scale. Fig. 3 is a transverse sectional view taken on the line 3 3, Fig. 2; and Fig. 4 is an enlarged perspective view of one of the deflectors.

1 and 2 represent, respectively, the side and end walls of the car-body, and 3 indicates the downwardly-extending passages usually employed in ventilators of this kind for admitting the air to the aforesaid longitudinal passages extending under and constituted by the slatted flooring.

4 represents the longitudinal beams or sills which extend throughout the length of the car and upon which the transverse slats 5, constituting the false flooring, are supported and secured. The sills or beams 4, any suitable number of which may be employed in conjunction with the slats 5, constitute one or more longitudinal air-spaces 6, which communicate at each end with the downwardly-extending passages 3 and receive air from one and discharge it through the other of such passages 3, according to the direction in which the car may be moving, as shown by the arrows in Fig. 2. In order that this current of air passing through the passages 6 may be deflected upwardly into the body of the car through the channels or openings constituted by the slats 5, I arrange under each of the slats 5 a deflector 7, which is double-ended, so as to catch the air no matter which way the car is moving. This deflector 7 is preferably secured by nails or other means to the under side of the slat 5 at its intermediate portion and extends downwardly toward the floor proper; 8, in an inclined direction, and in order that these inclined portions may be supported and their distortion from rough usage prevented each is also secured to one of the adjacent slats 5. This may be best accomplished by providing each of the inclined portions with upwardly-extending side pieces 9, whose upper edges are each provided with an ear 10, which underlies and is secured to one of the adjacent slats 5, while the intermediate portion of the deflector is given a flat form 11, extending laterally in both directions and having perforations whereby it may be nailed to the middle slat 5. The inclined portions of the deflector do not extend entirely to the floor 8, so that when the false floorings constituted by the slats 5 and beams 4 are taken out of the car and stacked up as usual none of the weight will be sustained by the lower ends of the deflectors. The deflector, made as shown and described with reference to Fig. 4, is employed when it is desirable to secure the deflector midway between the sills or beams 4; but in instances where the deflector may be arranged against one of the beams or sills 4 the upwardly-extending portions 9 and ears 10 on one side will of course be unnecessary, and each of the inclined portions on that side may be provided with simply an upturned ear 12, as shown in Fig. 3, whereby the inclined portion may be nailed or otherwise secured to the contiguous beam 4. The upwardly-extending flanges or side pieces 9, however, perform the further useful function of preventing the air from escaping laterally from the inclined deflectors back into the passage 6, and in order that the air may not thus escape back into the passage 6 after it has risen above the edge or edges of the side portions 9 the space between the slats 5 is closed by a strip of sheet metal or other suitable material 13, extending under and secured to the slats 5 and projecting from one or both sides of the deflector 7, according to whether the deflector is arranged immediately contiguous to one of the beams 4 or at a point intermediate between such beams. As shown in Fig. 3, the middle deflector is located at a point intermediate between the beams 4, and consequently one of the plates 13 extends from each side of the deflector to the adjacent beam 4, over which it laps, and, if desired, it may be tacked or otherwise secured thereto. Consequently the air striking the middle deflector is compelled to rise into the cross-channel constituted by the slats 5, and should the open upper side of this cross-channel be substantially closed by compact freight supported across it the air entering through the opening immediately above the deflector would be compelled to pass along between the slats throughout the entire transverse extent of the car, and if it escapes at all from such cross-channel it must escape upwardly through the freight, because the opening between the slats is closed by the plates 13 throughout the transverse extent of the car on each side of the deflector.

The deflectors are preferably of less width or transverse extent than the distance between the beams or sills 4, and they are so arranged that the air escaping past one in the passage 6 will strike the next one at a point farther along the passage, and the current escaping past that one will strike still another one arranged out of line therewith and at a still farther point along the passage. In this way the first deflector, arranged at the farther right-hand corner in Fig. 1, may be made to drive the air from one side of the car to the other between the slats 5 and plates 13, as shown by the arrows. The next deflector, which is arranged at an intermediate point between the two middle sills 4, is made to drive the air in both directions across the car, the amount escaping downwardly on one side, where the rear end of the first deflector is arranged, being immaterial and only adding to the current, which will be caught by the deflector arranged at the point 14 and again driven upwardly into the body of the car. The next deflector, which is located between the near pair of beams 4, as seen in Fig. 1, also drives the air in both directions across the car, and that portion of the current which escapes downwardly through the opening over the rear side of the middle deflector just described will be trapped by the deflector arranged at the point 15 and again driven upwardly into the car, and so on throughout the length and breadth of the car, as will be understood.

Having thus described my invention, what I claim as new therein, and desire to secure by Letters Patent, is—

1. A car-ventilator having in combination a longitudinal air-passage provided with end openings for the admission of air thereto and openings throughout its length for the discharge of the air into the body of the car; deflectors arranged in said passage and being disposed in lines extending diagonally across such passage whereby the current escaping one deflector will be caught by the next farther along the passage, said deflectors being of less width individually than said passage but the sum of their widths being substantially equal to the width of said passage, substantially as set forth.

2. A car-ventilator having in combination a false floor constituting an air-passage having openings leading upwardly into the body of the car, and deflectors arranged in said passage under said openings and being substantially equal to the dimensions thereof so as to completely underlie said openings, substantially as set forth.

3. A car-ventilator having in combination a longitudinal passage having end openings for the admission of air thereto and discharge-openings disposed at intervals throughout its length and an open-sided channel extending horizontally from said discharge-opening and over and across said passage, and deflectors arranged under said discharge-openings, substantially as set forth.

4. A car-ventilator having in combination a false floor provided with transverse slats arranged with spaces between them, a deflector secured to one of said slats and having its opposite ends inclined downwardly and oppositely and each secured to an adjacent one of said slats, substantially as set forth.

5. A car-ventilator having in combination a false floor provided with transverse slats arranged with a space between them, deflectors extending downwardly from said slats and having the side portions 9, and plates extending from said side portions and closing the under side of the space between said slats, substantially as set forth.

6. A car-ventilator having in combination a false floor provided with slats arranged with a space between them, deflectors secured to one of said slats at its intermediate point and having its opposite ends inclined downwardly on each side of said slat and being provided with ears 10 each secured to the under side of one of the adjacent slats, substantially as set forth.

7. A car-ventilator having in combination a longitudinal air-space provided with end openings for the admission of air thereto and discharge-openings throughout its length for letting the air into the body of the car, and a deflector inclining downwardly into said passage from one side of said discharge-opening and having a side member extending upwardly to a diagonally opposite side of said discharge-opening, substantially as set forth.

8. As a new and useful article of manufacture a deflector for car-ventilators having opposite ends inclined downwardly and provided with one or more upwardly-extending side flanges, and means whereby said flanges may be secured to a suitable support, substantially as set forth.

JOHN M. DALY.

Witnesses:
EDNA B. JOHNSON,
F. A. HOPKINS.